United States Patent Office 2,972,614
Patented Feb. 21, 1961

2,972,614
PROCESS OF PRODUCING MELAMINE

Josef Disteldorf, Wanne-Eickel, Germany, assignor to Bergwerksgesellschaft Hibernia Aktiengesellschaft, Stickstoffwerk Wanne-Eickel, Germany, a corporation of Germany No Drawing. Filed Aug. 26, 1958, Ser. No. 757,195

10 Claims. (Cl. 260—249.7)

The present invention relates to an improved process of producing melamine and more particularly to an improved process of producing melamine by heating urea under pressure in the presence of catalysts. This application is a continuation-in-part of application Serial No. 413,451, filed March 1, 1954, now abandoned.

It is known to produce melamine by heating urea under pressure. It has been suggested in order to cause favorable displacement of the equilibrium of said reaction to introduce ammonia and to catalytically accelerate the reaction by the addition of ammonium salts, such as ammonium chloride, ammonium sulfate, ammonium phosphate, or of compounds which, under the reaction conditions, are capable of forming ammonium salts. It has been found, however, that when carrying out the reaction in the presence of ammonia and ammonium salts in apparatus made of iron or iron alloys of a low content of alloying metals, considerable corrosion of the walls of said reaction apparatus takes place and that the resulting reaction products are so heavily contaminated that they are substantially technically useless. Therefore, it has been suggested to provide the reaction autoclaves with linings of materials or alloys that do not react with the reactants or compounds formed on reaction, or that react therewith only to a slight extent. The suggestion was made to use as lining material for this purpose silver, gold, titanium, nickel, iron-chromium-nickel alloys, platinum metals and their alloys, aluminum, and glass.

In the production of melamine from urea under pressure there had been used as catalyst magnesium in the form of the salts or anhydrides of phosphorus, sulfur and chlorine. The catalytic activity of these compounds was based upon the cation. In order to obtain a measurable conversion with these catalysts it was necessary to use large amounts thereof, for example 5%; and these quantities interfered with the production of melamine.

Hence the reaction was conducted at higher temperatures and pressures, but this caused a partial splitting of melamine into guanidine. As a result there was obtained an impure, resin-containing paste which required additional treatment for purification. In any case the activity of these catalysts was unsatisfactory; they permitted only a moderate lowering of the reaction temperature and pressure necessary for the formation of melamine and, in general, a temperature over 400° C. was used.

It is an object of the present invention to provide a process of producing melamine by heating under pressure for the conversion of urea to melamine, wherein both the reaction temperature and pressure are substantially lowered and wherein substantially pure melamine in greater yield is obtained. Thereby the introduction of ammonia, which was applied in prior processes, is greatly reduced and even eliminated. Previously the use of ammonia was necessary to the dilution of gases formed in the reaction in order to limit the corrosive effects thereof. Since it was not possible to operate under mild reaction conditions and/or greatly reduced reaction time, the reduction of corrosion was disadvantageous.

Other objects of this invention and advantageous features thereof will become apparent as the description proceeds.

In accordance with the present invention, the transformation of urea into melamine is facilitated by the application of certain heavy metal catalysts. These catalysts are specifically the non-precious heavy metals of the eighth group of the periodic system; i.e., iron, cobalt and nickel. Other non-precious heavy metals are copper, tin, zinc, chromium and manganese. Contrary to the literature in the use of magnesium salts as catalyst, it has been most unexpectedly found that the cation can be eliminated as far as catalytic activity is concerned. Therefore the above identified heavy metals are now used preferably in the form of metals or their oxides.

It may be possible to use these heavy metals in the form of their chlorides, sulfates, phosphates or nitrates; but there is the danger of the corrosion of the inner walls of the reaction vessel. It is therefore necessary in these cases that the walls of the reaction vessel be made of corrosion resistant materials. However, with the catalyst in the form of metal or oxide this is not necessary. Most unexpectedly, it has been found that with metal or oxide the danger of corrosion is minimized, and especially if the walls of the reaction vessel are composed of the same metal as the catalyst or of alloys containing the same. The catalysts are introduced into the urea in finely powdered form. From this it follows that the above mentioned salts may be used, provided they are soluble in molten urea under the conditions of the reaction, such as tin tetrachloride.

The most active of the catalysts is iron; the application of only 0.5% based on the weight of urea results in a measurable reduction of reaction time and further, a marked reduction of reaction temperature and pressure. Equally usable are chromium, zinc, tin and copper. Cobalt, nickel and manganese are moderately active, although their catalytic effectiveness is less than that of the above named metals. It is also possible to obtain good results with mixtures of these catalysts.

To prove the surprising effects achieved by the addition of catalysts according to the present invention, the following experiments were carried out.

Urea is heated in a sealed heavy-walled glass tube to the hereinafter indicated temperatures with and without the addition of catalytically active catalysts according to the present invention. The applied pressures are self generated; they are dependent upon the volume of the reaction products relative to the reaction space, the character of the reaction and the applied temperature. These factors have been determined experimentally so that the pressures range from 60 to 150 atmospheres. The following table shows the yield of melamine obtained thereby:

| Addition | Time, Hours | Percent Production at— | | | | Remarks |
|---|---|---|---|---|---|---|
| | | 300° | 325° | 350° | 400° | |
| None | 1 | | | | 2 | At 450° C.—1 hr. 26%; 2 hrs. 87% with much by-product formation. |
| 1% MgSO$_4$ | 1 | | | 5 | 20 | |
| 5% MgSO$_4$ | 1 | 1 | 5 | 30 | 74 | Much by-product formation with production of guanidine. |
| 0.5% Fe | 1 | 21 | 50 | 91 | 98 | |
| 1% Co | 1 | 3 | 16 | 43 | 86 | |
| 1% Ni | 1 | | 8 | 31 | 78 | |
| 1% Cu | 1 | 8 | 17 | 59 | 91 | |
| 1% Zn | 1 | 11 | 23 | 63 | 87 | |
| 1% Sn | 1 | 9 | 31 | 59 | 95 | |
| 1% Cr | 1 | 6 | 11 | 38 | 90 | |
| 1% Mn | 1 | | 4 | 26 | 75 | |
| 2% ZnO | 1 | 16 | 19 | 64 | 97 | |
| 0.5% Fe$_2$O$_3$ | 1 | 18 | 42 | 90 | 93 | |
| 0.5% C$_2$O$_3$ | 1 | 2 | 17 | 31 | 85 | |
| 1% SnCl$_4$ | 1 | 15 | 42 | 95 | 98 | |
| 1% CuSO$_4$ | 1 | 9 | 22 | 71 | 95 | |
| 0.5% Cr(NO$_3$)$_3$ | 1 | 14 | 17 | 68 | 85 | |
| 1% Fe(PO$_4$)$_2$·8H$_2$O | 1 | 8 | 33 | 80 | 92 | |

From the above table it follows that with equal reaction times importantly higher yields are obtained at lower reaction temperatures by the use of the catalysts of the present invention than was heretofore possible. Also with the present catalysts, even when used in quite small amounts, higher yields are obtained without by-products than when 5% of MgSO$_4$ is used. It is important to note a comparison of the effectiveness of the present catalysts with MgCl$_2$ and MgPO$_4$, the use of which show an effectiveness hardly distinguishable from MgSO$_4$ listed on the above table.

Although the speed of reaction is dependent, to a certain extent, upon the amount of catalyst added, it is advisable not to add too high an amount of catalyst since higher amounts cause higher contamination of the reaction products and, thus, render further working up of the reaction products more difficult. In general, amounts between 0.1% and 2.0%, calculated on the amount of urea reacted, have been found to be sufficient. When using less active catalysts, the amount added to the urea can be increased, for instance, to 5%. Larger amounts of catalyst can also be added without having any substantial adverse effect upon the reaction. But, in general, it is advisable not to use larger amounts than 5% in order to avoid the difficulties inherent in the handling of the reaction mixture and the working-up of the reaction product.

Conversion of urea into melamine requires a minimum pressure of about 60 atmospheres gauge. In the absence of a catalyst a reaction temperature of at least 380° C. and a reaction time of more than one hour is required. If such a temperature and pressure are not attained, the yield of melamine is very considerably reduced by conversion thereof into melam and melon. Increase in pressure alone does not cause any substantial increase in yield or speed of reaction. Increase in temperature causes an increase in pressure and considerably shortens the reaction duration. Higher temperature and pressure, however, require special apparatus and increase the technical difficulties encountered on working under such conditions.

In the practical operation the reaction is conducted between about 370° and 450° C. at pressures between 60 and 150 atmospheres. As shown in the table it is possible to use lower temperatures with good results. The application of the higher temperatures has the advantage of a shorter reaction time; the time is reduced to ¼ to ⅕ of the time necessary in the absence of a catalyst. The shorter time also reduced the danger of corrosion. Basically temperatures from 290° to 600° C. may be used but the above ranges are the most practical. In this range it is possible to reduce the temperature by about 100° to 120° C. without lowering the yield of melamine.

The catalysts according to the present invention are more effective at lower reaction temperatures than at higher ones. When working in continuous operation, the reaction duration of the urea to be reacted can be calculated from the ratio between space available for the reaction and amount of urea introduced into said space per unit of time. However, gaseous products, such as carbon dioxide and ammonia, are formed during the reaction. Said gaseous products do not further participate in the reaction but occupy a large volume and, thus, a large part of the available space of reaction. Therefore, it is advisable to continuously or intermittently separate the gaseous products formed during the reaction from the other reaction products and to remove them from the reaction chamber, for instance, by temporarily releasing the pressure. As a result thereof, a much better utilization of the space available for the reaction of unreacted starting material is achieved.

By the process according to the present invention the advantage is achieved that, when working at the same reaction temperatures as heretofore, smaller reaction chambers can be used or that considerably lower reaction temperatures and pressures than heretofore considered necessary, can be employed in order to obtain satisfactory yields and substantially pure products. As long as one works at the lower temperatures it becomes unnecessary to introduce ammonia or at least the addition is minimized. At higher temperatures by-products tend to form which, as is known, is reduced by the presence of ammonia, which acts as a shield between the melamine and its decomposition products. It is, therefore, not necessary to provide complicated apparatus and means for recovering the ammonia. The process is especially suitable for continuous operation since it permits substantial shortening of the reaction period.

The following examples serve to illustrate the present invention without, however, limiting the same thereto.

*Example 1*

Urea is mixed with 0.5% of iron powder and is melted. The molten mixture is brought under a pressure of about 60 atmospheres gauge by means of a pump adapted to convey liquids, and is pumped into a reaction chamber, the walls of which are silver plated. The mixture is heated therein to a temperature of 400° C. The reaction chamber is in the form of a cylindrical vessel and its dimensions are such that urea and solid and/or liquid reaction products and catalyst are passed therethrough and remain therein for about 1 hour. The reaction proceeds according to the following equation:

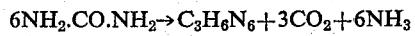

$$6NH_2.CO.NH_2 \rightarrow C_3H_6N_6 + 3CO_2 + 6NH_3$$

After cooling the mixture and removing the gaseous reaction products, 95% of melamine are obtained. If the reaction is carried out in a vessel, the inner walls of which consist of iron alloyed with small amounts of chromium and nickel, corrosion is avoided; it eliminates the serious contamination of the product resulting from corrosion when the operation is conducted with a catalyst in this vessel. The yield is about 96%.

The purification of the crude product is obtained by dissolving it in hot water and filtered. After filtration, the solution is cooled and the melamine crystallized in large hexagonal white flakes.

*Example 2*

Urea is mixed with 0.5% of tin tetrachloride and is melted, whereby the tin tetrachloride is dissolved in the melt. The molten mixture is brought to a pressure of at least 85 atmospheres gauge by means of a pump adapted to convey liquids and is pumped into a reaction chamber, the walls of which consist of an iron alloy having a high chromium and nickel content, where it is heated to 450° C. The reaction chamber consists of an elongated tube system which is enlarged at two places so that the gaseous reaction products formed intermediately can be separated from the remaining reaction mixture. They are removed from said system by outlet elements provided at said enlarged parts of the tube system. The dimensions of the reaction chamber are such that the non-gaseous reaction mixture is passed therethrough and kept therein for about 15 minutes. After cooling the mixture and removing the residual gaseous reaction products, 95% of melamine are produced.

*Example 3*

Under the conditions of Example 2, urea containing 2% of ZnO is heated. The reaction temperature reaches 420° C., the pressure 100 atmospheres. After ½ hour, the yield is 95% of melamine.

*Example 4*

Under the conditions of Example 1, urea containing 0.5% of chromium nitrate is reacted at a temperature of 400° C. at a pressure of 100 atmospheres. After one hour, the yield is 85% of melamine.

*Example 5*

Under the conditions of Example 2, urea is mixed with 1% of zinc dust. The temperature of reaction is 400° C. and the pressure is 100 atmospheres. After one hour, the yield is 87% of melamine.

Of course, many changes and variations in the reaction conditions, the temperature and pressure employed, the reaction duration, the amounts of catalysts added, the methods of working up the reaction mixture and the like may be made by those skilled in the art in accordance with the principles set forth herein and in the claims annexed hereto.

I claim:

1. A process for producing melamine from urea which comprises heating urea with a catalyst under pressure of about 60 to 150 atmospheres to a temperature of about 290° to 600° C. for a relatively short time, said catalyst being uniformly distributed throughout the urea, the amount of catalyst being sufficient to substantially accelerate the conversion of the urea, said catalyst being taken from the class consisting of non-precious heavy metals of the eighth group of the periodic system, copper, tin, zinc and chromium and manganese, said catalyst being taken from the class consisting of elementary metal, metal oxide, and metal salt capable of being converted to metal oxide at the temperature of the reaction.

2. A process according to claim 1 wherein the pressure is about 100 atmospheres.

3. A process according to claim 1 wherein the temperature of the reaction is about 370° to 450° C.

4. A process according to claim 1 wherein the operation is conducted in the absence of added ammonia.

5. A process according to claim 1 wherein the time of reaction is about one hour.

6. A process according to claim 1 wherein the catalyst is in the form of metal.

7. A process according to claim 1 wherein the catalyst is in the form of metal oxide.

8. A process according to claim 1 wherein the amount of catalyst is about 0.5 to 5.0% based on the urea.

9. A process according to claim 1 wherein the amount of catalyst is not over about 1%.

10. A process according to claim 1 wherein the catalyst is in the form of a salt which is adapted to be converted into the oxide under the conditions of the reaction.

References Cited in the file of this patent

UNITED STATES PATENTS

| | | |
|---|---|---|
| 2,206,603 | Foster | June 2, 1940 |
| 2,542,762 | Forbes et al. | Feb. 20, 1951 |
| 2,550,659 | Vingee | Apr. 24, 1951 |
| 2,760,961 | Mackay | Aug. 28, 1956 |

FOREIGN PATENTS

| | | |
|---|---|---|
| 473,964 | Canada | May 29, 1951 |
| 522,979 | Belgium | Oct. 15, 1953 |
| 754,720 | Great Britain | Aug. 8, 1956 |
| 1,083,791 | France | June 30, 1954 |

OTHER REFERENCES

Woldman: "Engineering Alloys," American Society for Metals, publication, revised 1954 (copyrighted 1936), pages 186, 631, 637, 681 and 751.